US009499170B2

(12) United States Patent
Cunningham

(10) Patent No.: US 9,499,170 B2
(45) Date of Patent: Nov. 22, 2016

(54) METHOD AND SYSTEM FOR OPERATING A VEHICLE POWERTRAIN

(71) Applicant: Ford Global Technologies, LLC, Dearborn, MI (US)

(72) Inventor: Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/543,424

(22) Filed: Nov. 17, 2014

(65) Prior Publication Data

US 2015/0072833 A1    Mar. 12, 2015

Related U.S. Application Data

(63) Continuation of application No. 13/558,244, filed on Jul. 25, 2012, now Pat. No. 8,888,653.

(51) Int. Cl.

| B60W 30/18 | (2012.01) |
|---|---|
| F02D 23/00 | (2006.01) |
| F02D 29/02 | (2006.01) |
| F16H 61/54 | (2006.01) |
| B60W 10/06 | (2006.01) |
| B60W 10/10 | (2012.01) |
| F02D 13/02 | (2006.01) |
| F02B 75/12 | (2006.01) |
| F02D 41/02 | (2006.01) |
| F02D 41/00 | (2006.01) |
| F02B 37/12 | (2006.01) |

(52) U.S. Cl.
CPC ........ *B60W 30/18063* (2013.01); *B60W 10/06* (2013.01); *B60W 10/10* (2013.01); *F02D 23/00* (2013.01); *F02D 29/02* (2013.01); *F16H 61/54* (2013.01); B60W 2510/0676 (2013.01); B60W 2520/06 (2013.01); B60W 2540/10 (2013.01); B60W 2710/0644 (2013.01); B60W 2710/105 (2013.01); F02B 37/12 (2013.01); F02B 2075/125 (2013.01); F02D 13/0215 (2013.01); F02D 13/0265 (2013.01); F02D 13/0269 (2013.01); F02D 41/0007 (2013.01); F02D 41/0215 (2013.01); F16H 2312/02 (2013.01); Y02T 10/123 (2013.01); Y02T 10/142 (2013.01); Y02T 10/144 (2013.01); Y10T 477/633 (2015.01); Y10T 477/75 (2015.01)

(58) Field of Classification Search
None
See application file for complete search history.

(56) References Cited

U.S. PATENT DOCUMENTS

| 3,955,366 A | 5/1976 | Hansen et al. |
|---|---|---|
| 5,213,186 A | 5/1993 | Murata |
| 5,263,319 A | 11/1993 | By et al. |
| 7,247,124 B2 | 7/2007 | Tamai |
| 7,597,072 B2 | 10/2009 | Stein et al. |
| 7,785,229 B2 | 8/2010 | Maddock |
| 8,196,726 B2 | 6/2012 | Bradley et al. |

(Continued)

FOREIGN PATENT DOCUMENTS

JP    2010031914 A    2/2010

*Primary Examiner* — Justin Holmes
(74) *Attorney, Agent, or Firm* — Julia Voutyras; Alleman Hall McCoy Russell & Tuttle LLP

(57) ABSTRACT

A system and method for operating a vehicle powertrain are described. In one example, a torque converter that has a variable K factor is adjusted to improve vehicle operation. The system and method may improve vehicle launch and vehicle operation at lower vehicle speeds.

11 Claims, 4 Drawing Sheets

(56) References Cited

U.S. PATENT DOCUMENTS

| | | |
|---|---|---|
| 8,323,149 B2 | 12/2012 | Cullen et al. |
| 2008/0176705 A1 | 7/2008 | Tamai et al. |
| 2010/0116245 A1 | 5/2010 | Andri |
| 2011/0005215 A1 | 1/2011 | Ota et al. |
| 2011/0240428 A1 | 10/2011 | Fujikane et al. |
| 2012/0010044 A1 | 1/2012 | Gibson et al. |
| 2013/0296126 A1* | 11/2013 | Gibson .................. F02N 11/006 477/5 |
| 2013/0297187 A1* | 11/2013 | Doering ................ F02D 41/022 701/104 |

* cited by examiner

METHOD AND SYSTEM FOR OPERATING A VEHICLE POWERTRAIN

CROSS REFERENCE TO RELATED APPLICATIONS

The present application is a continuation of U.S. patent application Ser. No. 13/558,244, entitled "METHOD AND SYSTEM FOR OPERATING A VEHICLE POWERTRAIN," filed on Jul. 25, 2012, the entire contents of which are hereby incorporated by reference for all purposes.

BACKGROUND/SUMMARY

A vehicle that includes an automatic transmission may have a torque converter positioned between the vehicle's engine and the automatic transmission. The torque converter provides a viscous fluidic coupling between the engine and the automatic transmission. By coupling the engine to the transmission via fluid, it is possible to rotate the engine without rotating the transmission output at lower engine speeds. Further, the transmission input can rotate at nearly engine speed while the engine operates at higher speeds. Accordingly, the efficiency of torque transfer through the torque converter improves at higher engine speeds. In addition, engine torque supplied to the automatic transmission may be multiplied by a factor between 1 and 3 when the engine operates between low and high speeds.

A torque converter is often designed with a fixed K factor. The K factor is a constant that allows a torque converter to be characterized independent of the engine coupled to the torque converter, and it is expressed as RPM at stall speed divided by square root of torque at stall speed. The torque converter K factor is related to the torque converter's turbine, impeller, and stator designs. A torque converter may be designed with a high K factor to increase torque multiplication at lower engine speeds. However, the high K factor torque converter may not provide a desired vehicle response at other operating conditions where less torque multiplication is desired. On the other hand, a torque converter may be designed with a low K factor to transfer engine torque more efficiently at lower engine speeds. However, a vehicle including a torque converter with a low K factor may not launch as quickly as is desired during some conditions.

The inventors herein have recognized the above-mentioned limitations and have developed a method for operating a vehicle powertrain, comprising: increasing a K factor of a torque converter in response to a torque provided via an engine being less than a desired torque. For example, if a vehicle wheel torque is less than desired, the torque converter K factor can be increased so that additional wheel torque may be observed.

By adjusting the torque converter K factor in response to a torque provided by an engine being less than a desired torque, it may be possible to provide more consistent vehicle launches during varying vehicle operating conditions. In one example, the torque converter K factor is increased during vehicle launch so that torque multiplication by the torque converter increases so as to increase wheel torque. Additionally, increasing the torque converter K factor may allow engine speed to increase since less engine torque is needed to accelerate the vehicle. And, increasing the engine speed may allow the engine to reach an operation condition where more torque may be provided by the engine. Thus, vehicle launch may be improved during conditions that would otherwise degrade vehicle launch.

The present description may provide several advantages. In particular, the approach may improve vehicle launch. Further, the approach may improve vehicle drivability during cold conditions. Further still, the approach may provide for a more consistent wheel torque over a wider range of vehicle operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
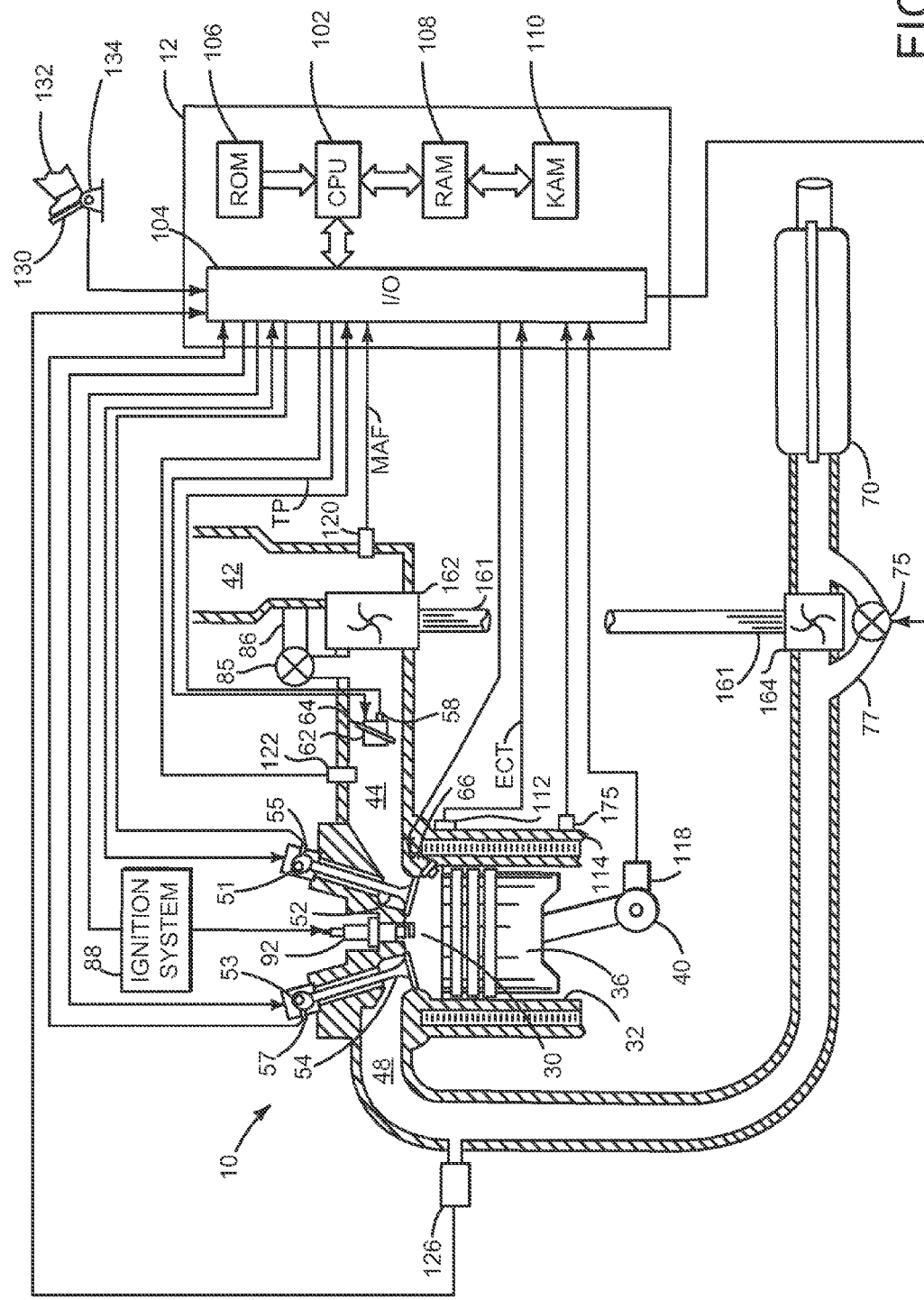
FIG. 1 shows a schematic depiction of an engine.
Figure 2:
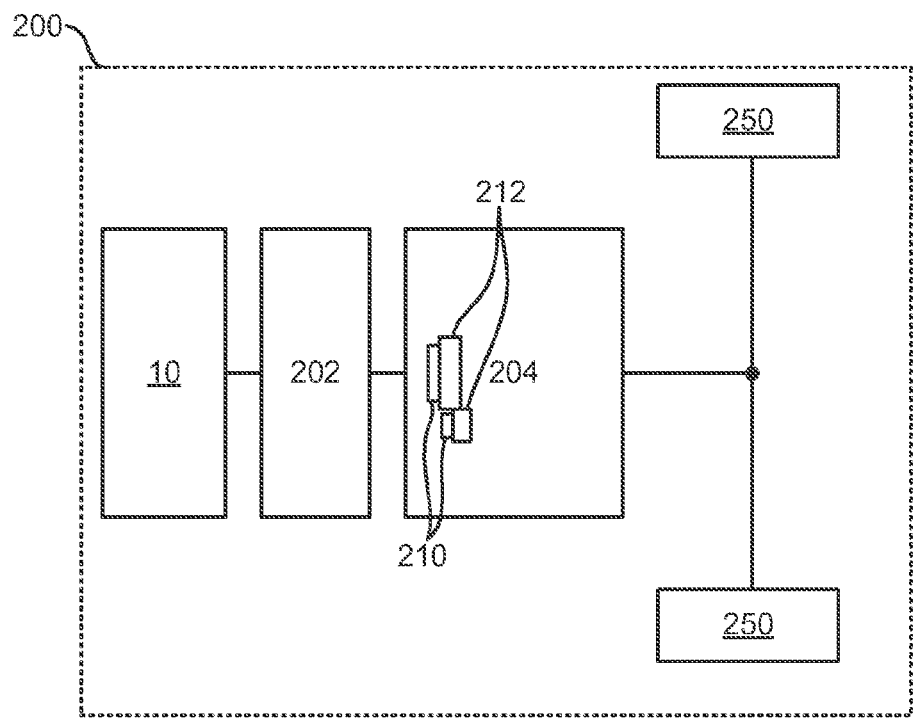
FIG. 2 shows an example vehicle powertrain including an engine and transmission.
Figure 3:
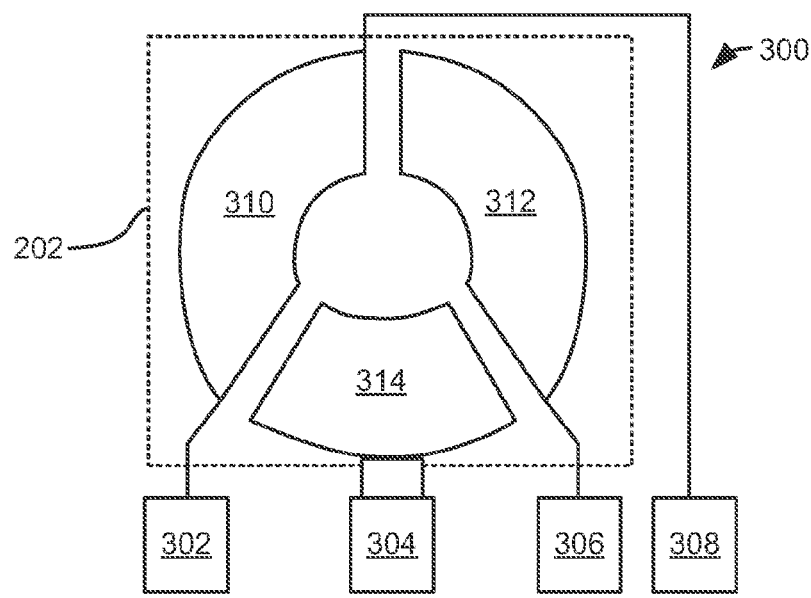
FIG. 3 shows an example schematic of a torque converter system.
Figure 4:
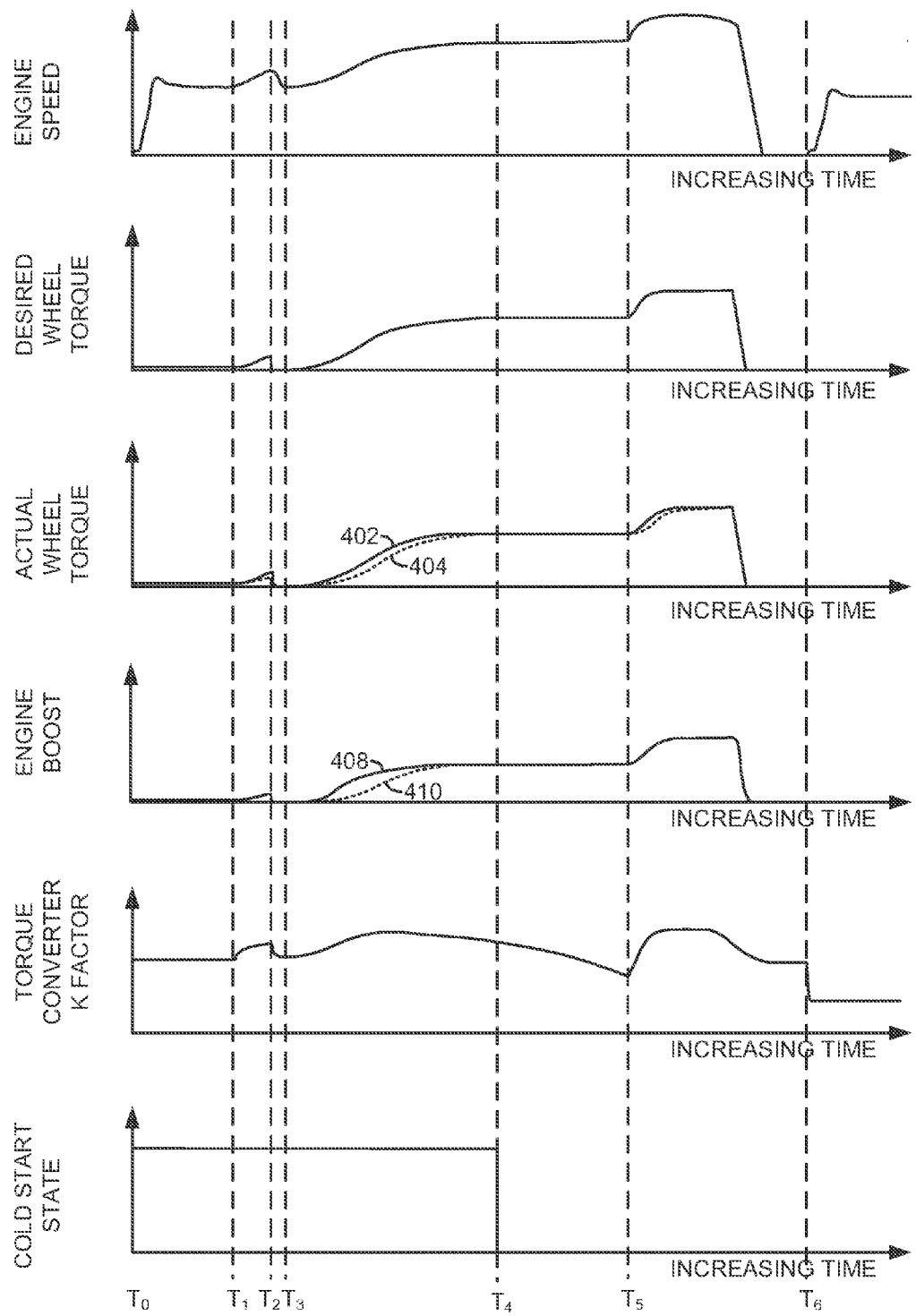
FIG. 4 shows an example powertrain operating sequence according to the method of FIG. 5.
Figure 5:
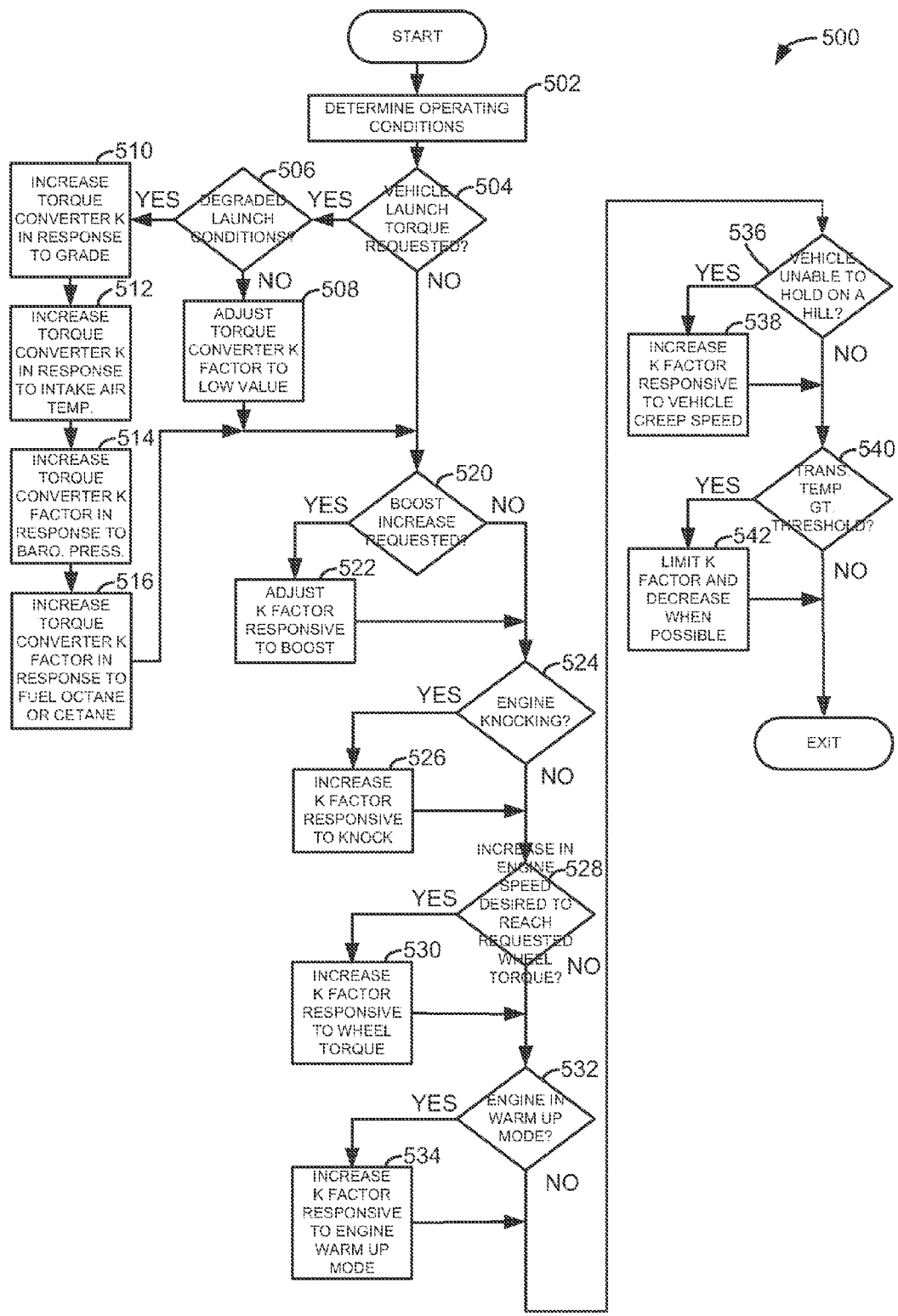
FIG. 5 shows an example method for operating a vehicle powertrain.

The present description is related to operating a vehicle with a powertrain. In one example, a torque converter K factor is adjusted to improve vehicle performance when operating conditions would otherwise degrade vehicle performance. One example system in which vehicle performance may be improved is shown in FIGS. 1 and 2. FIG. 3 shows an example torque converter which can be adjusted to provide different K factors. An example vehicle operating sequence according to the method of FIG. 5 is shown in FIG. 4. Finally, a method for operating a vehicle including a torque converter with an adjustable K factor is shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Further, a compressor bypass passage 86 may be provided in some examples to limit pressure provided by compressor 162. Flow though bypass passage 86 is regulated via valve 85. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system, such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; a measure of engine knock from sensor 175; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a vehicle 200 including engine 10 is shown. Engine 10 is mechanically coupled to torque converter 202 and transmission 204. Torque converter 202 is fastened to a flywheel that is mechanically coupled to crankshaft 40 shown in FIG. 1. Torque converter 202 includes an output that is in mechanical communication with an input shaft of transmission 204. Transmission 204 includes clutches 210 and gears 212. Output from transmission 204 may be directed to vehicle wheels 250.

Engine 10 rotates the exterior housing of torque converter 202 which is coupled to a flywheel. Vanes within torque converter 202 pump transmission fluid from an impeller to a turbine. The turbine transfers torque from the engine to an input shaft of transmission 204 via transmission fluid. A stator within torque converter 202 returns transmission fluid back to the impeller so that transmission fluid may be used repeatedly used to transfer torque from the engine to the transmission.

Gears having a plurality of fixed ratios direct engine torque to vehicle wheels 250. A particular gear may be activated via closing a clutch 210 associated with the selected gear. Lower gears (e.g., first gear) transform engine speed to a lower speed and higher torque at the transmission output so that the vehicle may accelerate at a faster rate. Higher gears (e.g., $5^{th}$ or $6^{th}$ gear) may allow the transmission output speed to rotate at a same or lower speed than engine 10.

Referring now to FIG. 3, an example torque converter system 300 is shown. Torque converter system includes torque converter 202 including impeller 310, turbine 312, stator 314, input shaft 308, output shaft 306, and one way clutch 304. Output shaft 306 includes a hydraulically operated piston (not shown) that can move turbine 312 axially toward or away from impeller 310, thereby changing the torque converter K factor. Pressurized transmission fluid may be selectively supplied to either end of the hydraulically operated piston to change piston position, and the piston is in mechanical communication with turbine 312 such that when the piston changes position, the turbine changes position.

Referring now to FIG. 4, a simulated example vehicle operating sequence is shown. The sequence of FIG. 4 may be provided by the system shown in FIGS. 1 and 2 executing the method of FIG. 5. Vertical markers at times $T_0$-$T_5$ indicate times of particular interest during the illustrated sequence.

The first plot from the top of FIG. 4 represents engine speed versus time. The X axis represents time and time increases in the direction of the X axis arrow. The Y axis represents engine speed and engine speed increases in the direction of the Y axis arrow.

The second plot from the top of FIG. 4 represents desired wheel torque versus time. The X axis represents time and time increases in the direction of the X axis arrow. The Y axis represents desired wheel torque and desired wheel torque increases in the direction of the Y axis arrow.

The third plot from the top of FIG. 4 represents actual wheel torque versus time. The X axis represents time and time increases in the direction of the X axis arrow. The Y axis represents actual wheel torque and actual wheel torque increases in the direction of the Y axis arrow. Trace 402 represents actual wheel torque when the method of FIG. 5 is executed. Trace 404 represents actual wheel torque when the method of FIG. 5 is not executed.

The fourth plot from the top of FIG. 4 represents engine boost versus time. The X axis represents time and time increases in the direction of the X axis arrow. The Y axis represents engine boost and engine boost increases in the direction of the Y axis arrow. Trace 408 represents desired engine boost. Trace 410 represents actual engine boost.

The fifth plot from the top of FIG. 4 represents torque converter K factor versus time. The X axis represents time and time increases in the direction of the X axis arrow. The Y axis represents torque converter K factor and torque converter K factor increases in the direction of the Y axis arrow.

The sixth plot from the top of FIG. 4 represents engine cold start state flag versus time. The X axis represents time and time increases in the direction of the X axis arrow. The Y axis represents engine cold start flag and the engine is at cold start conditions when the cold start flag is asserted at a higher level.

At time $T_0$, the engine is off and desired wheel torque, actual wheel torque, and turbocharger boost are at zero. The torque converter K factor is set at a predetermined value in response to the engine being stopped and the cold start state flag is at a value of one to indicate operating conditions are indicative of a cold start. In this example, the torque converter K factor is adjusted to a relatively high level for the cold engine start.

Between time $T_0$ and time $T_1$, the engine is started in response to an operator request and engine speed increases. The operator or driver has not input an engine torque demand. Therefore, engine speed goes to an idle speed. The desired wheel torque and the actual wheel torque remain at zero. The turbocharger boost level is also shown at a relatively low level, and the torque converter K factor remains at the same constant level as when the engine is started. The cold engine start flag remains asserted since engine operating conditions remain consistent with cold starting conditions. The K factor is set to a higher level when the engine is cold started so that more slip may be provided in the torque converter to transmit less engine torque to the vehicle wheels while engine speed is at an idle level where less engine torque is transmitted through the torque converter.

At time $T_1$, the operator increases a wheel torque command to propel the vehicle forward. In one example, a position of an accelerator pedal may be converted into a desired wheel torque via a transfer function that relates accelerator pedal position to wheel torque. In other examples, the accelerator pedal position may be converted to a desired engine torque via a transfer function, and the desired engine torque may be converted to a desired wheel torque taking the transmission gear and torque converter state into consideration.

The actual wheel torque is increased to follow desired wheel torque via increasing engine speed and load. The engine load is increased by opening the engine throttle and increasing pressure of air or boost supplied to the engine. The torque converter K factor is also shown increasing so that the actual wheel torque more closely matches the desired wheel torque. In one example, the torque converter K factor may be increased as a function of a difference between the desired and actual wheel torques. In other examples, the torque converter K factor may be increased in response to a difference between an actual boost amount and a desired boost amount. Further, the K factor may be increased in response to operating conditions that may degrade engine performance. For example, the K factor may be increased in response to decreasing barometric pressure and engine knock.

At time $T_2$, the desired wheel torque decreases in response to a decrease in desired wheel torque by the operator. The engine speed and load decrease to reduce the actual wheel torque so that it matches the desire wheel torque. The torque converter K factor is also reduced since the desired wheel torque may be provided without the torque converter K factor being at a higher level. In some examples, the torque converter K factor may be reduced at selected conditions where actual wheel torque matches or is within a predetermined torque range of desired wheel torque so that torque converter slip can be reduced, thereby increasing torque converter efficiency. The engine cold start flag remains at an elevated level indicating that the engine and vehicle have not warmed to a level outside of cold start conditions.

At time $T_3$, the desired wheel torque begins to increase again in response to an increase in desired wheel torque by the operator. The engine speed and load are also increased in response to the desired wheel torque input by the operator. However, since engine speed is relatively low, actual engine boost is not able to match the desired engine boost. Consequently, the torque converter K factor is increased so that engine speed can increase faster as a result of less resistance to engine motion. Increasing the torque converter K factor may reduce turbocharger lag.

Between time $T_3$ and time $T_4$, desired wheel torque and actual wheel torque level off at a middle level. The turbocharger boost level also levels out to a middle level and the torque converter K factor is reduced so that less torque converter slip is present. The torque converter may also be locked during these conditions to improve vehicle fuel efficiency. The torque converter K factor is reduced in response to the actual wheel torque matching or equaling the desired wheel torque. And, since engine speed is higher, less slip is present within the torque converter.

At time $T_4$, the engine reaches a warmed up state as indicated by the engine cold start state flag transitioning to a lower level. The desired wheel torque and actual wheel torque reach relatively constant values. The torque converter K factor continues to be reduced to improve efficiency of torque transfer from the engine to the vehicle wheels.

At time $T_5$, desired wheel torque is increased in response to a driver input to accelerate the vehicle. The engine speed and load are also increased to provide the desired wheel torque. The desired engine boost and actual engine boost are at the same level since the engine speed is at an elevated level where the turbocharger can increase output with little lag time. For example, the boost level may be increased simply via partially closing a waste gate so that time is not needed for the compressor to ramp up to a speed where the desired boost may be provided. Consequently, the torque converter K factor is not adjusted in response to boost during these conditions. Rather, the torque converter K factor is increased so that engine speed may be increased to a level where additional torque may be provided to the wheels. Further, increasing the K factor increases torque multiplication through the torque converter so that more wheel torque may be provided. By increasing the K factor during a request for additional wheel torque, it may be possible to avoid shifting the transmission.

Between time $T_5$ and time $T_6$, the engine is stopped. The desired and actual wheel torque is reduced to zero as is engine boost. The torque converter K factor is adjusted to a level desirable for cold start conditions at the time of engine shutdown.

At time $T_6$, the engine is restarted. The engine is started during warm conditions so that the engine cold start state flag is not asserted. The torque converter K factor is reduced at starting time in response to warm engine temperature because less torque converter slip is desired because the engine is being operated more efficiently than during the cold start. The desired and actual wheel torque levels remain at zero indicating no driver input to accelerate the vehicle. Boost is also shown at a low level. The sequence ends shortly after time $T_6$.

Referring now to FIG. 5, a method for operating a vehicle powertrain is described. The method of FIG. 5 may be applied in the system of FIGS. 1 and 2. In one example, the method of FIG. 5 may be stored in non-transitory memory of controller 12 of FIG. 1 as executable instructions.

At 502, method 500 determines operating conditions. Operating conditions may include but are not limited to engine temperature, engine speed, wheel torque demand, accelerator position, engine boost amount, engine knock, transmission temperature, and engine operating mode. Method 500 proceeds to 504 after operating conditions are determined.

At 504, method 500 judges whether or not a vehicle launch is requested. In one example, method 500 may determine a vehicle launch request is present when vehicle speed is less than a threshold speed (e.g., less than 5 Kilometers per hour) and when a driver or controller requested wheel torque or engine torque exceeds a threshold level. If method 500 judges that a vehicle launch is requested, the answer is yes and method 500 proceeds to 506. Otherwise, the answer is no and method 500 proceeds to 520.

At 506, method 500 judges whether or not the vehicle is operating under degraded launch conditions. Degraded launch conditions are conditions that may cause the vehicle to accelerate at less than a predetermined rate for a predetermined engine torque or wheel torque request. Some conditions that may constitute degraded launch conditions include where the vehicle is towing a trailer or when the vehicle is being operated at a relatively high altitude. If method 500 judges that the vehicle is operating under degraded launch conditions, the answer is yes and method 500 proceeds to 510. Otherwise, the answer is no and method 500 proceeds to 508.

At 508, method 500 reduces or adjusts the torque converter K factor to a lower value. In one example, the torque converter K factor is adjusted via axially moving a torque converter turbine relative to a torque converter impeller. Thus, for nominal vehicle operating conditions, the torque converter K factor may be adjusted to a lower value to improve torque converter torque transfer efficiency. Method 500 proceeds to 520 after the torque converter K factor is reduced.

At 510, method 500 increases the torque converter K factor in response to an increasing positive road grade. Grade may be sensed via an inclinometer or inferred from vehicle operating conditions. The torque converter K factor may be increased linearly or non-linearly with increasing road grade amounts. In one example, the torque converter K factor is increased after road grade exceeds a predetermined road grade. Otherwise, the torque converter K factor is not adjusted for road grade. Further, if road grade decreases, method 500 decreases the torque converter K factor. Increasing road grade can decrease vehicle acceleration, and the decreased vehicle acceleration may be at least partially compensated by increasing engine torque multiplication through the torque converter. Method 500 proceeds to 512 after adjusting the torque converter K factor.

At 512, method 500 increases the torque converter K factor in response to increasing engine air intake temperature. On the other hand, if engine air intake temperature is decreasing the torque converter K factor may be decreased. The torque converter K factor may be increased linearly or non-linearly with increasing engine air intake temperature. Increasing engine air intake temperature can decrease engine torque output, and the decreased engine torque may be at least partially compensated by increasing engine torque multiplication through the torque converter. Method 500 proceeds to 514 after adjusting the torque converter K factor.

At 514, method 500 increases the torque converter K factor in response to decreasing barometric pressure. Conversely, if barometric pressure is increasing the torque converter K factor may be decreased. The torque converter K factor may be increased linearly or non-linearly with increasing engine air intake temperature. Decreasing barometric pressure can decrease engine torque output, and the decreased engine torque may be at least partially compensated by increasing engine torque multiplication through the torque converter. Method 500 proceeds to 516 after adjusting the torque converter K factor.

At 516, method 500 increases the torque converter K factor in response to decreasing fuel octane. Conversely, if fuel octane is increasing the torque converter K factor may be decreased. The torque converter K factor may be increased linearly or non-linearly with increasing fuel octane. Decreasing fuel octane can decrease engine torque output, and the decreased engine torque may be at least partially compensated by increasing engine torque multiplication through the torque converter. Further, the engine may be operated at a higher speed when the torque converter K factor is increased so that knock may be avoided. Method 500 proceeds to 520 after adjusting the torque converter K factor.

Additionally, in some examples the torque converter K factor may be increased when the vehicle is towing or hauling cargo. Method 500 may infer or sense when the vehicle is towing or hauling cargo.

At 520, method 500 judges whether an engine boost increase is requested. An engine boost increase may be requested in response to an operator or controller request to increase wheel torque or engine torque. Increasing boost pressure allows additional air to be supplied to the engine so that engine output may be increased. If method 500 judges that a boost increase is requested, the answer is yes and method 500 proceeds to 522. Otherwise, the answer is no and method 500 proceeds to 524. In some examples, the torque converter K factor may be reduced or held constant before method 500 proceeds to 524 when no increase in boost is requested.

At 522, method 500 adjusts the torque converter K factor responsive to engine boost. In one example, method 500 adjusts the torque converter K factor in response to an error or difference between desired engine boost and actual engine boost. For example, if actual boost is less than desired boost, the torque converter K factor is increased. As the difference between actual and desired boost goes to zero, the torque converter K factor is reduced. The torque converter K factor may be adjusted according to empirically determined torque converter K factors that are stored in memory and retrieved when there is a difference between actual engine boost and desired engine boost. Method 500 proceeds to 524 after the torque converter K factor is adjusted.

At 524, method 500 judges whether an engine knock is present. Engine knock may be determined via output of a knock sensor. If method 500 judges that a knock is present, the answer is yes and method 500 proceeds to 526. Otherwise, the answer is no and method 500 proceeds to 528. In some examples, the torque converter K factor may be reduced or held constant before method 500 proceeds to 528 when no engine knock is present.

At 526, method 500 adjusts the torque converter K factor responsive to engine knock. The torque converter K factor may be adjusted according to empirically determined torque converter K factors that are stored in memory and retrieved when knock is indicated. Method 500 proceeds to 528 after the torque converter K factor is adjusted.

At 528, method 500 judges whether an increase in engine speed to reach a desired wheel torque is requested. During some conditions, engine speed may be increased so that engine torque output is increased. The increased engine torque may result in increased wheel torque. One way to increase engine speed is to down shift a transmission coupled to the engine. However, downshifts may not be desirable as they may be noticeable to a driver. On the other hand, by increasing the torque converter K factor when additional wheel torque is requested, it may be possible to avoid down shifting because the higher torque converter K factor allows the engine to reach a higher speed and it also may increase torque multiplication though the torque converter, thereby increasing wheel torque. In one example, method 500 judges whether or not it may be desirable to increase engine speed to provide a requested wheel torque based on empirically determined data stored in memory that is based on engine speed and engine torque. Engine torque at a desired wheel torque may be inferred based on the engaged transmission gear. If method 500 judges that an increase in engine speed is desired, the answer is yes and method 500 proceeds to 530. Otherwise, the answer is no and method 500 proceeds to 532. In some examples, the torque converter K factor may be reduced or held constant before method 500 proceeds to 532 when no increase in engine speed is desired.

At 530, method 500 adjusts the torque converter K factor responsive to engine in increase in desired engine speed. In one example, method 500 adjusts the torque converter K factor in response to an empirically determined engine speed at which the desired wheel torque may be provided. The torque converter K factor may be adjusted according to empirically determined torque converter K factors that are stored in memory and retrieved when an increase in engine speed is desired to meet a desired wheel torque. Method 500 proceeds to 532 after the torque converter K factor is adjusted.

At 532, method 500 judges whether or not the engine is operating in a warm up mode. During a warm up mode, an engine may be operated with increased spark retard, idle speed, and air flow to more rapidly heat the engine and exhaust system. The increased engine speed may act to increase the amount of torque transmitted to vehicle wheels. Therefore, it may be desirable to increase torque converter slip so that the torque converter operates less efficiently. Method 500 may determine the engine is operating in a warm up mode by making inquiry of a cold start state flag. If method 500 judges that the engine is in a warm up mode, the answer is yes and method 500 proceeds to 534. Otherwise, the answer is no and method 500 proceeds to 536. In some examples, the torque converter K factor may be reduced or held constant before method 500 proceeds to 536 when warm up mode is not requested.

At 532, method 500 adjusts the torque converter K factor responsive to engine warm up mode. In one example, method 500 increases the torque converter K factor in response to the engine operating in warm up mode as compared to when the engine is not operating in warm up mode. The torque converter K factor may be reduced when the engine exits warm up mode. The increase in torque converter K factor may be empirically determined and stored in memory for subsequent retrieval. Method 500 proceeds to 536 after the torque converter K factor is adjusted.

At 536, method 500 judges whether or not the vehicle is able to hold a position while stopped on a hill. For example, if the vehicle is stopped and a driver releases a brake pedal, it may be desirable to provide sufficient wheel torque to keep the vehicle from rolling in a reverse direction. If the vehicle forward speed is less than desired or reverse vehicle motion is detected while the vehicle is in first gear, the torque converter K factor may be adjusted. If method 500 judges that the vehicle is unable to hold a position on a hill or maintain a desired forward creep speed, the answer is yes and method 500 proceeds to 538. Otherwise, the answer is no and method 500 proceeds to 540. In some examples, the torque converter K factor may be reduced or held constant before method 500 proceeds to 540 when hill hold is not requested.

At 538, method 500 increases the torque converter K factor responsive to the ability of the vehicle to hold on a hill or in response to vehicle creep speed. In one example, the torque converter K factor is incrementally increased until vehicle speed is maintained on a hill or until a desire vehicle creep speed is achieved. If the vehicle moves off the hill or creep speed increased to a value greater than desired, the torque converter K factor may be reduced. Method 500 proceeds to 540 after the torque converter K factor is adjusted.

At 540, method 500 judges whether or not transmission fluid temperature is greater than a threshold temperature. If method 500 judges that transmission fluid temperature is greater than a threshold temperature, the answer is yes and method 500 proceeds to 542. Otherwise, the answer is no and method 500 proceeds to exit. In some examples, the torque converter K factor may be reduced or held constant before method 500 proceeds to exit when transmission temperature is less than the threshold temperature.

At 542, method 500 decreases the torque converter K factor when possible up to a threshold limit. The threshold limit may be based on a desired vehicle acceleration rate or other factor. In one example, the torque converter K factor reduction is based on a difference between desired transmission fluid temperature and actual transmission fluid temperature. The adjusted torque converter K factor may be empirically determined and stored in memory. Method 500 proceeds to exit after the torque converter K factor is adjusted.

Thus, the method of FIG. 5 provides for a method for operating a vehicle powertrain, comprising: increasing a K factor of a torque converter in response to a torque provided via an engine being less than a desired torque. In this way, the torque converter may be adjusted to increase wheel torque when engine operating conditions degrade. The method includes where the torque is a wheel torque and where the desired torque is a desired wheel torque. The method includes where the K factor is increased in response to a difference between the wheel torque and the desired wheel torque.

In some examples, the method further comprises adjusting the K factor in response to one or more environmental conditions that reduce the torque provided via the engine. The method includes where the one or more environmental conditions include a road grade greater than a threshold road grade. The method includes where the one or more environmental conditions include a barometric pressure less than a threshold barometric pressure. The method includes where the one or more environmental conditions include a fuel octane number lower than a threshold octane number.

In another example, the method of FIG. 5 provides for operating a vehicle powertrain, comprising: adjusting a K factor of a torque converter in response to a vehicle speed condition and absent a driver input demand torque while a transmission is operated in first gear. The method includes where the vehicle speed condition is an indication of vehicle movement in a reverse direction. The method includes where the vehicle speed condition is a difference between a desired vehicle creep speed and an actual vehicle creep speed. In some examples, the method further comprises increasing engine speed and engine air flow in response to an engine temperature less than a threshold temperature. The method also includes where adjusting the K factor includes increasing the K factor.

The method of FIG. 5 also provides for operating a vehicle powertrain, comprising: adjusting a K factor of a torque converter in response to a difference between a desired boost pressure and an actual boost pressure. The method includes where the boost pressure is provide via a turbocharger, and further comprising increasing the K factor in response to an increasing engine torque demand when adjusting the K factor will increase engine output torque. The method further comprises increasing the K factor in response to an indication of engine knock. The method further comprises reducing the K factor in response to an engine temperature greater than a threshold temperature. The method includes where the K factor is increased in response to a desired boost pressure being greater than an actual boost pressure. The method further comprises increasing engine speed. The method includes where the K factor is adjusted via adjusting an axial position of a turbine relative to an impeller. In another example, the method further comprises adjusting the K factor in response to a vehicle speed condition.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. A method for operating a vehicle powertrain, comprising:
   adjusting a K factor of a torque converter in response to a difference between a desired vehicle creep speed and an actual vehicle creep speed and absent a driver input demand torque while a transmission is operated in first gear; and
   increasing engine speed and engine air flow in response to an engine temperature less than a threshold temperature.

2. The method of claim 1, where the K factor is adjusted responsive to vehicle movement in a reverse direction.

3. The method of claim 1, wherein the powertrain includes an engine, the method further comprising direct injecting fuel to the engine.

4. The method of claim 1, where adjusting the K factor includes increasing the K factor.

5. A method for operating a vehicle powertrain, comprising:
   adjusting a K factor of a torque converter in response to a difference between a desired boost pressure and an actual boost pressure, where the K factor is adjusted via adjusting an axial position of a turbine relative to an impeller.

6. The method of claim 5, where the actual boost pressure is provide via a turbocharger, and further comprising increasing the K factor in response to an increasing engine torque demand when adjusting the K factor will increase engine output torque.

7. The method of claim 5, further comprising increasing the K factor in response to an indication of engine knock.

8. The method of claim 5, further comprising reducing the K factor in response to an engine temperature greater than a threshold temperature.

9. The method of claim 5, where the K factor is increased in response to a desired boost pressure being greater than an actual boost pressure.

10. The method of claim 5, further comprising increasing engine speed.

11. The method of claim 7, further comprising adjusting the K factor in response to a vehicle speed condition.

* * * * *